Aug. 8, 1939.  J. E. CHANDONIA  2,168,470
HEARTH PAN STRUCTURE
Filed July 29, 1938
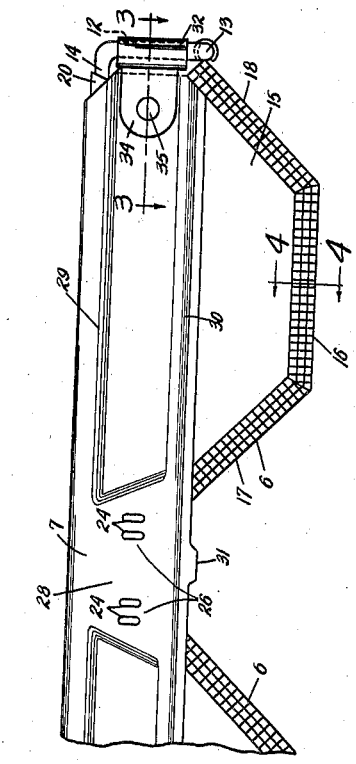
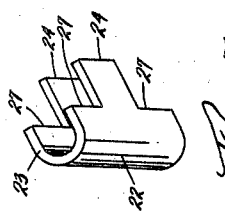
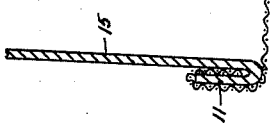
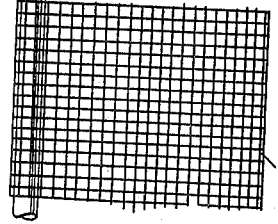
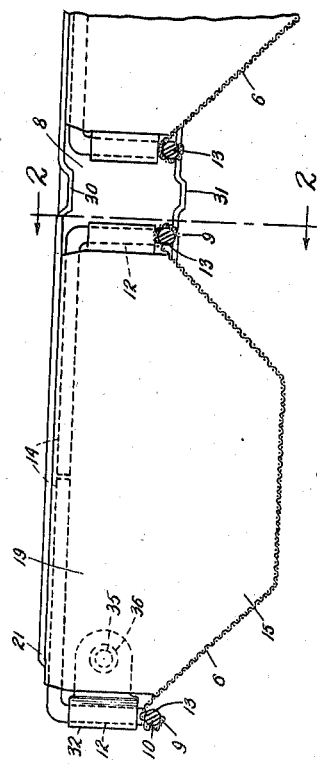
INVENTOR
John E. Chandonia
BY
Frank Zugelter
ATTORNEY Patented Aug. 8, 1939

2,168,470

UNITED STATES PATENT OFFICE 2,168,470

HEARTH PAN STRUCTURE

John E. Chandonia, Cincinnati, Ohio, assignor to The Lockwood Manufacturing Company, Cincinnati, Ohio, a corporation of Ohio Application July 29, 1938, Serial No. 222,017

5 Claims. (Cl. 53—6)

The present invention relates to a hearth pan structure which is in the nature of a multiple baking pan set particularly adapted for the baking of such breads, for example rye breads of various kinds, as are baked with the formation of a crust of extensive proportions.

An object of the invention is to provide a multiple pan structure of the character mentioned, which is durable and inexpensive to manufacture, considering the limitations or specifications that this particular type of pan set is required to meet.

Another object of the invention is to provide a pan set structure of the character stated, wherein are eliminated from the pan interiors, any and all structural elements that might mark the bakery product if such a structural element were permitted to extend into the pan interiors, or were exposed therein.

These and other objects are attained by the means described herein and disclosed in the accompanying drawing, in which:

Fig. 1 is a side elevational view of a pan set embodying the invention, approximately one half of said set being shown in cross-section along the center line of the pan set.

Fig. 2 is an enlarged fragmental cross-sectional view taken on line 2—2 of Fig. 1.

Fig. 3 is an enlarged fragmental cross-sectional view taken on line 3—3 of Fig. 1.

Fig. 4 is an enlarged cross-section taken on line 4—4 of Fig. 1.

Fig. 5 is a perspective view of a mounting clip which forms a detail of the invention.

In multiple pan sets of the character herein disclosed, which ordinarily are employed in the baking of hearth products, it is desirable that the bottoms and sides of the individual pans be constructed of mesh material, which may be of woven wires or of perforated sheet metal, as desired. Moreover, the individual pans of the set should be so constructed that the sides of the pans be constructed at a lower elevation than the pan ends, for various reasons. One important reason for so lowering the pan sides, is to facilitate the slitting of the tops of the loaves before subjecting them to the baking operation. It will be observed by inspecting any rye bread loaf or the like, that the upper face of the loaf is marked with transverse ridges or depressions indicating that the loaf had been slitted across its top surface before baking. This slitting of the loaves would be rendered difficult were the sides of the pans higher than the plastic dough mass initially placed in the pan, hence the lowering of the sides so that a knife or other slitting instrument may be drawn across all the loaves of a pan set without interference with the pan sides. The lowering of the pan sides as above related, has presented structural difficulties in manufacturing multiple pan sets wherein all the pans are supported by means of strapping applied along their ends. One of the objects of the present invention is to provide means for overcoming the difficulties of manufacturing, in the best possible manner.

With reference to the accompanying drawing, the characters 6 indicate a plurality of baking pans each of which is secured to a pair of longitudinal straps 7 and 8, to provide a unitary structure. The bottom and sides of each pan are constructed of a single sheet of mesh material formed to provide a basket or pocket for holding a dough mass to be baked. The mesh sheet is suspended along its sides by turning the side edges 9 of the sheet about a frame 10 which is preferably constructed of a single length of round wire or rod stock, as disclosed in Fig. 1. The frame may be of a generally rectangle shape, with the opposite ends of the rectangle turned upward to furnish riser portions 12 which project above the side edges of the pan where the pan is suspended by means of the transverse rods 13 of the frame. At each end of the frame, the risers 12 are connected together well above the transverse portions 13, by means of a strut or frame end piece 14, which preferably is an integral part of the frame.

With reference now to the right hand side of Fig. 1, and to Fig. 4, it will be noted that the opposite ends of each pan are constituted of a metallic plate 15 having lower edges corresponding in shape to the shape of the mesh sheet 6, and having turned flanges 11 along the bottom and sides of the pan whereby the end portions of the mesh sheet may be clamped to the pan ends 15 by means of double rolled seams, as indicated in Fig. 4. Such seams are furnished along the bottom and side edges of the end plates, at the locations 16, 17, and 18.

By means of the construction just described, each individual pan is made into a unitary structure having a dough supporting area provided by the mesh or perforated sheet 6, suspended along its sides by the transverse portions 13 of the reinforcing frame, the end plates 15 being secured by means of the double rolled seam where the end plates meet the dough supporting area to form the pan ends. It should be observed that the risers 12 are outside the limits of the pan interior, and the upper portion 19 of each pan end is located between pairs of risers, at an elevation above the transverse rods 13 of frame 10. The uppermost edge of each pan end may be curled about the aligned extensions 14 of the reinforcing frame, as indicated at 20 of Fig. 2. An inwardly turned edge 21 of each pan connecting strap may be arranged to overlie the turned edge of the pan end wall. It should be understood that the strut or frame end piece 14 of the pan frame, may be in one piece if desired, or separated as shown in Fig. 1.

The completed individual pans may be secured in spaced relationship to one another between the straps 7 and 8, by means of clips or fasteners 22 exemplified in Fig. 5, said clips or fasteners being constituted of a substantial U-shaped body portion 23 of a proper size for embracing a riser 12 and having prongs or tongues 24 extending from the legs of the U-shaped body in substantial parallelism, for insertion into pairs of apertures 25 (Fig. 2) formed in the straps. At the locations 26 of Fig. 1 is shown how the prongs or tongues penetrate the strap 7 through pairs of apertures therein, the free ends of the tongues or prongs being peened or turned against the outer face of the strap, for fixing the clip to the strap with the shoulders 27 abutting the interior face of the strap, as illustrated in Fig. 2. It should here be noted that the connection between the pan frame riser and the pan connecting strap may be effected by means of a clip or fastener having but a single prong or tongue 24, if desired. Where the attachment of the prongs to the connecting straps is effected, the connecting straps preferably are flattened as indicated at 28 of Fig. 1, thereby eliminating the strengthening ribs or flanges 29 and 30, which might interfere with proper anchoring of the clips or fasteners upon the connecting straps. If desired, the upper and lower edges of the connecting straps may be deformed as at 30 and 31, between the adjacent pan mountings to furnish recesses and projections, respectively, for assisting in properly nesting the pan sets upon one another in superposed relationship.

At the ends of the multiple pan structure, the connecting straps may be fixed to the endmost risers of the end pans, by means of a U-shaped strap 32 which embraces the riser and has its perforated ends 33 and 34 riveted as at 35 to the end strap. The head 36 of each rivet 35 is disposed between the end wall 15 of the pan and the leg 33 of the U-shaped strap, so that the rivet head is concealed in the finished construction. The foregoing is clearly shown in Fig. 3, and at the opposite ends of Fig. 1. By referring to the left side of the Fig. 1 drawing view, it should readily be evident that the inner face of the pan end is entirely free of exposed rivets or other fastening means, and that the clips 22 are so located outside the limits of the pan ends, that it is impossible for the bakery product to be marked or otherwise affected by the structural elements of the pan set.

It is to be understood that the particular kind of mesh or perforated sheet material employed for forming the dough supporting area of each individual pan, is immaterial to the invention, and may be left to the selection of the manufacturer or the purchaser of the pan sets. Moreover the number of individual pans to be included in the completed structure may be varied merely by providing longer or shorter pan connecting straps, and duplicating the manner of attaching the pans thereto, as hereinbefore explained. Various other modifications and changes in the structural details of the device may be made, within the scope of the appended claims, without departing from the spirit of the invention.

While it is presently considered that devices of the character disclosed herein should properly include mesh or perforated sheet pan constructions, there is no reason why the sheet material of the pans could not be of the ordinary unperforated or plain tinned stock so commonly used in the manufacture of bake pans, since the substitution of materials from which the pans are made does not alter the manner of assembly of the pan unit.

What is claimed is:

1. In a hearth pan structure, the combination of a plurality of pans each having a bottom and sides of perforate material, and an end wall supporting said bottom and sides, a reinforcing frame for the side and end walls of each pan, said frame including risers extending above the elevation of the side walls of the pan, a series of U-shaped clips each having a body portion for embracing a riser of the frame above the pan sides, and a tongue extending from the body portion, and a pan-connecting apertured trap extended along corresponding ends of the plurality of pans, the tongues of the clip bodies being extended through the apertures of the strap and turned against the strap for securing the riser portions of the pan frames to the pan-connecting straps.

2. In a hearth pan structure, the combination of a plurality of pans each having a dough supporting member of perforate sheet material, and an end wall secured to said dough supporting member with a portion of the end wall elevated substantially above it, a reinforcing frame including spaced parallel sides supporting opposite sides of the dough supporting member, and including upright riser portions at the ends of the frame sides rising to an elevation well above the frame sides, extensions at the upper ends of the risers and disposed in alignment parallel to the adjacent pan end wall, said end wall being turned along an edge thereof to embrace the extensions, a pan-connecting strap extended along the corresponding end walls of adjacent pans, and eye members each including prongs penetrating the strap and a body portion embracing a riser, for fixing the riser to the strap at each corner of each pan.

3. In a hearth pan structure, the combination of a plurality of pans each having a dough supporting member of perforate sheet material, and an end wall secured to said dough supporting member with a portion of the end wall elevated substantially above it, a reinforcing frame including spaced parallel sides supporting opposite sides of the dough supporting member, and including upright riser portions at the ends of the frame sides rising to an elevation well above the frame sides, extensions at the upper ends of the risers and disposed in alignment parallel to the adjacent pan end wall, said end wall being turned along an edge thereof to embrace the extensions, a pan-connecting strap extended along the corresponding end walls of adjacent pans, and eye members each including prongs penetrating the strap and a body portion embracing a riser, said body providing shoulders to abut the strap on one face thereof, the opposite face of the strap having the prongs turned thereon for holding the riser in fixed relationship to the strap above the level of the pan sides.

4. In a hearth pan structure, the combination of a plurality of pans each having a dough supporting member and an end wall secured thereto, said end wall extending above the dough supporting member, a reinforcing frame attached to the pan and including a riser extending upwardly along the upwardly extending portion of the end wall outside the limits of the end wall, a pan-connecting strap extending along the corresponding end walls of all the pans and in close proximity to the pan frame risers, and a clip embracing each riser and including means penetrating the strap to bind the risers to the strap outside the limits of the pan interiors.

5. In a multiple pan structure of the class described, the combination of a pan including a dough supporting member and an end wall secured thereto, a reinforcing frame attached to the pan and including riser portions at opposite sides of the pan end walls, said riser portions being exposed outside the limits of the pan interior, a pan-connecting strap extending along the exterior of the end wall of the pan, and means mounting the pan upon said strap comprising a pair of clips, each clip including a U-shaped body portion for embracing a riser, and a prong penetrating the strap and having a free end turned upon the strap exteriorly thereof.

JOHN E. CHANDONIA.